United States Patent
Joly et al.

(10) Patent No.: US 6,727,000 B2
(45) Date of Patent: Apr. 27, 2004

(54) MULTILAYER HEAT-SHRINKABLE SEALABLE FILMS

(75) Inventors: Anne-Marie Joly, Schriek (BE); Enrico Beccarini, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 26 days.

(21) Appl. No.: 09/979,470

(22) PCT Filed: Mar. 14, 2001

(86) PCT No.: PCT/EP01/02858
§ 371 (c)(1), (2), (4) Date: Nov. 20, 2001

(87) PCT Pub. No.: WO01/70500
PCT Pub. Date: Sep. 27, 2001

(65) Prior Publication Data
US 2002/0192483 A1 Dec. 19, 2002

(30) Foreign Application Priority Data
Mar. 22, 2000 (EP) .............................................. 00201022

(51) Int. Cl.⁷ .............................................. B32B 27/08
(52) U.S. Cl. ...................... 428/515; 428/516; 428/517; 428/519; 428/910
(58) Field of Search .............................. 428/515, 516, 428/213, 517, 519, 910

(56) References Cited

U.S. PATENT DOCUMENTS

| | | | |
|---|---|---|---|
| 4,532,189 A | 7/1985 | Mueller | 428/516 |
| 4,705,714 A * | 11/1987 | Itaba et al. | 428/215 |
| 5,677,044 A | 10/1997 | Beccarini et al. | 428/218 |
| 5,942,326 A * | 8/1999 | Ecoff et al. | 428/341 |

FOREIGN PATENT DOCUMENTS

| | | |
|---|---|---|
| EP | 0400333 | 12/1990 |
| EP | 0472946 | 3/1992 |
| EP | 0586160 | 3/1994 |
| EP | 0595252 | 5/1994 |
| WO | 9714558 | 4/1997 |
| WO | 9718084 | 5/1997 |

\* cited by examiner

Primary Examiner—Monique R. Jackson

(57) ABSTRACT

Multilayer heat-shrinkable films in which the skin layers A consist of a polyolefin selected from: A1) a composition containing 25–45% b.w. of a random copolymer of propylene with ethylene and 55–75% b.w. of a random terpolymer of propylene, ethylene and one or more $C_4$–$C_{10}$ alpha-olefins; and A2) random copolymer(s) of propylene and one or more $C_4$–$C_{10}$ alpha-olefins. Core layer B comprises a heterophasic composition comprising: a) 20–60% b.w. of a propylene homopolymer with an isotacticity index higher than 80 or of a propylene crystalline copolymer with ethylene and/or $C_4$–$C_{10}$ alpha-olefins containing at least 85% b.w. of propylene units and having an isotacticity index of at least 80 or of mixtures thereof and b) 40–80% b.w. of an ethylene copolymer with propylene and/or 1-butene and possibly a diene, containing 20–60% b.w. of ethylene units and completely soluble in xylene at 25° C.

18 Claims, No Drawings

MULTILAYER HEAT-SHRINKABLE SEALABLE FILMS

This application is the U.S. national phase of International Application PCT/EP01/02858, filed Mar. 14, 2001.

This invention relates to multilayer, essentially three-layer heat-shrinkable sealable films in which the skin layers comprise a propylene polymer or polymer composition having defined crystallinity and melting characteristics and a core layer comprises a heterophasic composition comprising a crystalline propylene polymer and an elastomeric olefin polymer. An optimum balance of mechanical properties, processability and sealability at low temperatures characterizes the films.

Three-layer heat-shrinkable films are usually prepared by a coextrusion process in which the main polymer component forming the core layer is fed to the central extruder and a suitable polymer component forming the skin layers and improving film properties, in particular its workability, is fed to the lateral extruders. Depending on the technology used a flat or tubular primary film is obtained which is then oriented in a biaxial direction by the known tenter frame or twin bubble methods. Three-layer heat-shrinkable films usually consist of a core layer essentially made up of linear low-ensity ethylene polymer (LLDPE) modified with 1-octene and two outer layers intended to improve film processing. It is known in fact that certain aspects of the production of heat-shrinkable films based on LLDPE are critical because the temperature at which the orientation process takes place is close to the temperature at which the polymer melts. There may thus be problems such as tearing of the film and instability of the bubble when the film is produced by the twin bubble method.

Examples of heat-shrinkable films are given in U.S. Pat. No. 4,532,189. This patent describes films with 3 or 5 layers in which the middle layer is made up of linear low- or medium-density ethylene copolymers with the possible addition of amorphous ethylene/propylene copolymers (EPC), ethylene/vinyl-acetate copolymers (EVA) or low-density polyethylene (LDPE) and the outer layers are primarily made up of EPC. The film is reported to have good physical mechanical characteristics.

Patent application EP-A-586160 describes heat-shrinkable multi-layer films in which the middle layer is made up of LLDPE and the outer layers may be made up of a propylene/butene copolymer, or blends of EPC with polybutene, or blends of propylene homopolymer or copolymer with a propylene/butene copolymer. The patent application reports that the film has good lap seal strength characteristics.

Patent application EP-A-595252 describes three-layer heat-shrinkable films in which the middle layer is made up of LLDPE to which additives such as hydrogenated hydrocarbon resins, polyethylene or polypropylene waxes. etc. are added. The addition of these additives is claimed to give improved physical mechanical characteristics and improved lap seal strength to the films. The outer layers are made up of polypropylene or ethylene propylene copolymers, also with the additives mentioned above.

The films of the known art present various problems however depending on the composition of the various layers. If the outside layers are made up of polypropylene and/or ethylene propylene copolymers, the film can only be heat-sealed at relatively high temperature. In addition, the temperature range suitable to the orientation of the film without tearing is restricted and shifted towards relatively high temperatures. The use of propylene butene copolymers in the outer layers of the film is claimed to lower the sealing temperature. However, a copolymer containing large amounts of butene has the disadvantage of increasing the percentage of polymer extractable in xylene to levels that are not acceptable for applications of the film in the food sector. In all cases, the use of polyethylene-based layers coupled with polypropylene-based layers can cause problems of delamination of the resultant film, because of the poor compatibility between the various layers.

Now it has been found that it is possible to prepare quite effective heat-shrinkable sealable films wherein the skin layers comprise a propylene polymer or polymer composition having suitable values for crystallinity—expressed as percentage of material melted at a certain temperature—melting point and xylene-insoluble fraction, and the core layer comprises a heterophasic polyolefin composition made up of a crystalline propylene polymer and an elastomeric olefin polymer. The films of the invention do actually have an optimum balance of physical mechanical properties, processability and sealability over a wider and lower temperature range in comparison with the multilayer films of the prior art. Moreover the films of the invention have a good compatibility between the layers and in particular good heat-shrinking properties.

The object of the invention is therefore a multilayer heat-shrinkable sealable film wherein the skin layers A essentially consist of a polyolefin selected from:

A1) a composition containing
 i) 25–45% by weight of a random copolymer of propylene and ethylene having 2–5% by weight of ethylene units, and
 ii) 55–75% by weight of a random terpolymer of propylene, ethylene and one or more $C_4$–$C_{10}$ alpha-olefins having 2–5% by weight of ethylene units and 6–12% by weight of alphaolefin units;

A2) a random copolymer of propylene and one or more $C_4$–$C_{10}$ alphaolefins or a blend of random copolymers of propylene and one or more $C_4$–$C_{10}$ alphaolefis with different composition, said copolymer or blend of copolymers containing 4–14% by weight of alphaolefin units;

said polyolefin having a xylene-insoluble fraction greater than 85% by weight, a maximum melting peak at temperatures above 130° C. and a crystallinity such that at 90° C. the percentage of material melted is greater than 15% by weight, and a core layer B essentially consists of a heterophasic composition comprising:

a) 20–60% by weight of a propylene homopolymer with an isotacticity index value—determined as percent by weight of the polymer insoluble in xylene at 25° C.—higher than 80 or of a propylene crystalline copolymer with ethylene and/or $C_4$–$C_{10}$ alphaolefins containing at least 85% by weight of propylene units and having an isotacticity index value of at least 80 or of mixtures thereof, and b) 40–80% by weight of an ethylene copolymer with propylene and/or $C_4$–$C_{10}$ alphaolefins and possibly a diene, containing 20–60% by weight of ethylene units and completely soluble in xylene at 25° C.

The maximum melting peak and the crystallinity level at a given temperature are determined by differential scanning calorimetry (DSC).

The polyolefin forming the skin layers A preferably has a crystallinity such that at 100° C. the percentage of material melted is greater than 20% and at 110° C. the percentage of material melted is greater than 30% by weight.

The polyolefin forming layers A preferably consists of a composition A1 of 30–40% by weight of a random copolymer of propylene and ethylene having 3–4% by weight of ethylene units and 60–70% by weight of a random terpolymer of propylene, ethylene and one or more $C_4$–$C_{10}$ alphaolefins having 3–4% by weight of ethylene units and 8–10% by weight of alphaolefin units. The alphaolefin is generally chosen from 1-butene, 1-hexene, 4-methyl-1-pentene and 1-octene, and preferably is 1-butene.

Other preferred embodiments of the polyolefin forming layers A are the random copolymers A2 of propylene and 1-butene with a total content of 4–10% by weight of 1-butene units, more preferably as a blend of copolymers having a different content of 1-butene units.

The polyolefin compositions used to form layers A can be produced by mixing the components in the molten state, for example in a mixer having a high homogenizing power or in an extruder. Preferably, however, said compositions are obtained directly by synthesis using a sequential polymerization process using stereospecific Ziegler-Natta catalysts as described in the granted European Patents 400333 and 472946.

The heterophasic composition used to prepare the core layer B comprises a crystalline propylene polymer or copolymer and an elastomeric olefin copolymer as specified in detail above. Preferably the heterophasic composition of layer B comprises:

a) 25–45% by weight of a propylene homopolymer with an isotacticity index value—determined as percent by weight of the polymer insoluble in xylene at 25° C.—higher than 80 or of a propylene crystalline copolymer with ethylene and/or $C_4$–$C_{10}$ alphaolefins containing at least 85% by weight of propylene units and having an isotacticity index value of at least 80, or of mixtures thereof; and b) 55–75% by weight of an ethylene copolymer with propylene and/or $C_4$–$C_{10}$ alphaolefins and 0–10% by weight of a diene, containing 20–60% by weight of ethylene units and completely soluble in xylene at 25° C.

The alphaolefins most commonly used both in fraction a) and in fraction b) of layer B are 1-butene, 1-hexene, 1-octene and 4-methyl-1-pentene. The diene possibly present in fraction b) of layer B preferably is 1,3-butadiene, 1,4-hexadiene or 5-thylidene-2-norbomene.

More preferably the heterophasic composition of the core layer B comprises:

a) 30–40% by weight of a propylene crystalline copolymer with ethylene containing at least 90% by weight of propylene units;

b) 60–70% by weight of an ethylene copolymer with propylene containing 25–60% by weight of ethylene units and completely soluble in xylene at 25° C.

The heterophasic compositions of layer B is preferably prepared by a sequential polymerization process using highly stereospecific Ziegler-Natta catalysts. Component a) is generally formed in the initial polymerization step whereas component b) is formed in a successive polymerization step. Suitable catalysts comprise in particular the reaction product of a solid component, including a titanium compound and an electron donating compound (internal electron donor) supported on magnesium chloride, with a trialkylaluminum compound and an electron donating compound (external electron donor). Preferably the titanium compound is titanium tetrachloride. The internal electron donor is preferably selected from alkyl, cycloalkyl and aryl phthalates, in particular from diisobutyl phthalate, di-n-butyl phthalate and di-n-octyl phthalate. The external donor is preferably selected from silicon compounds having at least one —OR group, where R is a hydrocarbon radical, e.g. diphenyl-dimethoxysilane, methyl-t-butyl-dimethoxysilane, diisopropyl-dimethoxysilane, cyclohexyl-methyl-dimethoxysilane, dicyclopentyl-dimethoxysilane and phenyl-trietoxysilane.

Examples of said heterophasic compositions, along with polymerization processes and catalysts suitable for their preparation, are described in the granted European Patents No. 400333 and 472946.

Said heterophasic compositions can also be obtained by mechanical mixing of the components a) and b) at a temperature higher than their softening or melting points.

In a particular embodiment of the invention the heterophasic composition to be used in layer B is partly crosslinked, usually with peroxides.

The melt flow rate, according to ASTM D 1238 condition L, of the heterophasic composition of layer B has values which are preferably in the range 0.4 to 3 g/10 minutes, more preferably 0.5 to 1.5 g/10 minutes.

In a possible embodiment of the invention the polymer material of core layer B is made up of a polymer composition comprising up to 75% by weight, referred to the total weight of layer B, of a component essentially the same as the polymer forming layers A but with a melt flow rate in the range 0.5–1 g/10 minutes. Also in the case of this embodiment the composition forming the core layer B can be produced either by mixing the components in the molten state or directly in an extruder or preferably by a sequential polymerization process as described in the patent documents mentioned above.

The films of the invention can be conveniently produced using methods known in the art, such as the tenter frame method or the twin-bubble method. In the first case the orientation of the film in the machine and transverse directions may be sequential or simultaneous, preferably simultaneous using e.g. a Lisim-Bruckner machine. In the second case the method involves the production of a primary tubular film with concentric layers by extrusion of the polymer components constituting the various layers through an annular slot. The primary film is calibrated and rapidly cooled and then heated by IR radiation or hot air and oriented in two directions by blowing with compressed air (transverse orientation) and increasing the speed of the take-up roll (longitudinal orientation). The bioriented film is then rapidly cooled to stabilize the molecular orientation of the film.

The films of the invention preferably are three-layer films with the structure ABA, in which layers A and B have the compositions described earlier. The various layers can be present in variable amounts relative to the total weight of the film. Each of the two outer layers is preferably present in amounts ranging from about 5 to about 45% of the total weight of the film. More preferably each of the outer layers is present in amounts between 10 and 30% by weight. The two outer layers are preferably present in equal parts. Compared to films of prior art having a similar structure, the films of the invention have an equivalent tear resistance along with an improved processability. The films can in fact be easily oriented, without facing any bubble instability problem, in a temperature range that is wider and lower than the conventionally used temperature ranges. The orientation at low temperature also has the advantage of improving the mechanical and optical properties of the film. The films of this invention are also characterized by a good compatibility between the layers, which reduces the delamination problems, and by a lower seal initiation temperature (S.I.T.) compared to films with similar structure in which the outer layers are made up of polypropylene and/or propylene ethylene copolymers.

In addition to the specified components, the films of the invention may contain additives such as adhesion enhancers, stabilizers, antioxidants, anticorrosive agents, processing aids, etc. as well as both organic and inorganic substances which can give specific properties.

The heat-shrinkable films of this invention have broad applications in the packaging sector, particularly the packaging of small objects foods, etc.

The following examples are given as illustrations and do not restrict the invention.

EXAMPLES

Three-layer films with the structure ABA were produced by the twin-bubble method and the following steps:

feeding of the polymer or polymer composition for the skin and core layers to the relevant extruders and extrusion of the three-layer tubular film with head temperatures between 180 and 220° C.;

cooling of the primary tubular film to room temperature;

heating of the primary film in an oven with IR rays or with hot air;

biorientation of the film by stretching to a ratio of 5–6 in both the longitudinal and transverse directions;

cooling of the bioriented tubular film to room temperature.

The thickness of the film was in the range 16–20 micron. Each of the outer layers contributed 15% to the total thickness and the middle layer 70%.

In all the examples the skin layers A were made of a heterophasic composition HC-1 prepared by sequential polymerization, consisting of i) 35% by weight of a random copolymer of propylene and ethylene having 3.25% by weight of ethylene units; and ii) 65% by weight of a random terpolymer of propylene, ethylene and 1-butene having 3.25% by weight of ethylene units and 9.2% by weight of 1-butene units.

The composition had a melt flow rate, according to ASTM D 1238 condition L, of 5.5 g/10 minutes, a xylene insoluble fraction of 91%, a maximum melting peak of 135° C. and a fraction of material melted at 90° C. of 16%. The core layer in example 1 was an heterophasic composition HC-2 having a melt flow rate according to ASTM D 1238 condition L of 0.6 g/10 minutes and consisting of a) 30% by weight of a propylene random copolymer with ethylene, containing 3.25% by weight of ethylene units, having an intrinsic viscosity [η] of 1.5 dl/g and a fraction soluble in xylene at 25° C. of about 9% by weight;

b) 70% by weight of a propylene copolymer with ethylene containing 30% by weight of ethylene units, having an intrinsic viscosity [η] of 3.2 dl/g and completely soluble in xylene at 25° C.

In examples 2 to 4 the core layer was a mixture in variable amounts of said heterophasic composition HC-2 with an heterophasic composition HC-3 consisting of i) 35% by weight of a random copolymer of propylene and ethylene having 3.25% by weight of ethylene units;

ii) 65% by weight of a random terpolymer of propylene, ethylene and 1-butene having 4% by weight of ethylene units and 9% by weight of 1-butene units, HC-3 having a melt flow rate, according to ASTM D 1238 condition L, of 0.9 g/10 minutes, a xylene insoluble fraction of 90%, a maximum melting peak of 136° C. and a fraction of material melted at 90° C. of 20%.

Example 5 is a comparative example including a core layer of Dowlex NG 5056 E, which is LLDPE modified with 1-octene marketed by Dow Chemicals.

The properties of the films were determined by the following methods:

Composition of polymers:
   percentage by weight of the various monomer units determined by IR.

Xylene-insoluble fraction:
   2 g of polymer is dissolved in 250 cm$^3$ of xylene at 135° C. while stirring. After 20 minutes the solution is left to cool, while still stirring, down to the temperature of 25° C. After 30 minutes the precipitated polymer is separated by filtration. The solvent is removed from the solution by evaporation in a stream of nitrogen and the residue is dried under vacuum at 80° C. up to a constant weight. In this way the percentage of polymer soluble in xylene at 25° C. is calculated and the percentage of polymer that is insoluble is thus determined.

Melt flow rate: ASTM D 1238 condition L.

Enthalpy of melting, melting point and % of material melted: ASTM D 3418-82.

Density: ASTMD 1505.

Haze: ASTMD 1003.

Gloss 45°: ASTM D 2457.

Tear resistance: ASTM D 1004, determined both in the transverse direction (TD) and in the machine direction (MD).

Elongation at break and tensile strength at break:
   ASTM D 882, determined both in the transverse direction (TD) and in the machine direction (MD).

Shrinkage: ASTM D 2732.

Table 1 shows the main characteristics of the films and Table 2 gives a detail of the shrinkage level as percent of the initial dimensions after a time of 5 minutes in oven at temperature ranging from 80 to 120° C. There is a clear improvement in the shrinking properties of the film of example 1 when the temperature is lower than 100° C. in comparison with the film of example 5, which contains LLDPE as core layer and closely resembles the films of the prior art. The films of the examples 2 to 4, show a lower shrinkage but interesting mechanical properties.

TABLE 1

Properties of coextruded ABA films with skin layers A made of heterophasic composition HC-1 and thickness distribution of the layers 15/70/15.

|  | Ex. 1 | Ex. 2 | Ex. 3 | Ex. 4 | Ex. 5 |
| --- | --- | --- | --- | --- | --- |
| Core layer B | HC-2 | 70% HC-2 30% HC-3 | 50% HC-2 50% HC-3 | 30% HC-2 70% HC-3 | LLDPE |
| Total thickness (micron) | 19.4 | 16.5 | 18.7 | 19.8 | 17.0 |
| Haze (%) | 3.4 | 3.2 | 4.6 | 5.5 | 3.2 |
| Gloss 45° (‰) | 83 | 86 | 82 | 82 | 83 |
| Tear resistance MD (g) | 10 | 7 | 4 | 4 | 5 |
| Tear resistance TD (g) | 8 | 5 | 6 | 5 | 6 |
| Tensile strength at break MD (MPa) | 106 | 126 | 126 | 144 | 123 |
| Tensile strength at break TD (MPa) | 77 | 94 | 123 | 128 | 115 |
| Elongation at break MD (%) | 82 | 78 | 76 | 84 | 102 |
| Elongation at break TD (%) | 103 | 100 | 95 | 112 | 95 |

TABLE 2

Free Shrinkage of the films after heat treatment at different temperatures for 5 minutes.

|  | Ex. 1 | Ex. 2 | Ex. 3 | Ex. 4 | Ex. 5 |
|---|---|---|---|---|---|
| MD Shrinkage (%) at | | | | | |
| 80° C. | 19 | 14 | 10 | 15 | 10 |
| 90° C. | 22 | 19 | 20 | 20 | 14 |
| 100° C. | 30 | 26 | 27 | 26 | 26 |
| 110° C. | 43 | 39 | 35 | 42 | 46 |
| 120° C. | 55 | 57 | 52 | 50 | 57 |
| TC Shrinkage (%) at | | | | | |
| 80° C. | 16 | 14 | 11 | 14 | 10 |
| 90° C. | 22 | 20 | 18 | 23 | 18 |
| 100° C. | 34 | 30 | 29 | 35 | 30 |
| 110° C. | 48 | 45 | 41 | 52 | 51 |
| 120° C. | 56 | 58 | 55 | 58 | 59 |

What is claimed is:

1. A multilayer film comprising skin layers A wherein the skin layers A essentially consist of a polyolefin selected from:
   A1) a composition containing
      i) 25–45% by weight of a random copolymer of propylene and ethylene having 2–5% by weight of ethylene units; and
      ii) 55–75% by weight of a random terpolymer of propylene, ethylene and one or more C4–C10 alphaolefins having 2–5% by weight of ethylene units and 6–12% by weight of alphaolefin units; or
   A2) a random copolymer of propylene and one or more $C_4$–$C_{10}$ alphaolefins or a blend of random copolymers of propylene and one or more $C_4$–$C_{10}$ alphaolefins with different composition, said copolymer or blend of copolymers containing 4–14% by weight of alphaolefin units;
   said polyolefin having a xylene-insoluble fraction greater than 85% by weight, a maximum melting peak at temperatures above 130° C. and a crystallinity such that at 90° C. the percentage of material melted is greater than 15% by weight; and
   a core layer B wherein the core layer B essentially consists of a heterophasic composition comprising:
      a) 20–60% by weight of a propylene homopolymer with an isotacticity index value, determined as percent by weight of the polymer insoluble in xylene at 25° C., higher than 80 or of a propylene crystalline copolymer with ethylene and/or $C_4$–$C_{10}$ alphaolefins containing at least 85% by weight of propylene units and having an isotacticity index value of at least 80 or of mixtures thereof; and
      b) 40–80% by weight of an ethylene copolymer with propylene and/or 1-butene and optionally a diene, containing 20–60% by weight of ethylene units and completely soluble in xylene at 25° C.

2. The multilayer film according to claim 1 wherein the polyolefin forming the skin layers A consists of the composition A1 containing 30–40% by weight of a random copolymer of propylene and ethylene having 3–4% by weight of ethylene units and 60–70% by weight of a random terpolymer of propylene, ethylene and one or more $C_4$–$C_{10}$ alphaolefins having 3–4% by weight of ethylene units and 8–10% by weight of alphaolefin units.

3. The multilayer film according to claim 1 wherein the alphaolefin present in the random terpolymer of composition A1 is 1-butene, 1-pentene, 1-hexene, 4-methyl-1-pentene, or 1-octene.

4. The multilayer film according to claim 1 wherein the alphaolefin present in the random terpolymer of composition A1 is 1-butene.

5. The multilayer film according to claim 1 wherein the polyolefin forming the skin layers A consists of a random copolymer of propylene and 1-butene with a content of 4–10% by weight of 1-butene units.

6. The multilayer film according to claim 1 wherein the polyolefin forming layers A consists of a blend of random copolymers of propylene and 1-butene having a different content of 1-butene units.

7. The multilayer film according to claim 1 wherein the heterophasic composition forming layer B consists of:
   a) 25–45% by weight of a propylene homopolymer with an isotacticity index value, determined as percent by weight of the polymer insoluble in xylene at 25° C., higher than 80 or of a propylene crystalline copolymer with ethylene and/or $C_4$–$C_{10}$ alphaolefins containing at least 85% by weight of propylene units and having an isotacticity index value of at least 80, or of mixtures thereof and
   b) 55–75% by weight of an ethylene copolymer with propylene and/or 1-butene and 0–10% by weight of a diene, containing 20–60% by weight of ethylene units and completely soluble in xylene at 25° C.

8. The multilayer film according to claim 1 wherein the alphaolefin present in fraction a) of the heterophasic composition of layer B is 1-butene, 1-hexene, 4-methyl-1-pentene or 1-octene.

9. The multilayer film according to claim 1 wherein the alphaolefin is 1-butene in each and every occurrence.

10. The multilayer film according to claim 1 wherein the diene optionally present in fraction b) of layer B is 1,3-butadiene, 1,4-hexadiene or 5-ethylidene-2-norbornene.

11. The multilayer film according to claim 1 wherein the heterophasic composition forming layer B consists of:
   a) 30–40% by weight of a propylene crystalline copolymer with ethylene containing at least 90% by weight of propylene units; and
   b) 60–70% by weight of an ethylene copolymer with propylene containing 25–60% by weight of ethylene units and completely soluble in xylene at 25° C.

12. The multilayer film according to claim 1 wherein the heterophasic composition forming layer B is partly crosslinked.

13. The multilayer film according to claim 1 wherein the heterophasic composition forming layer B has a melt flow rate according to ASTM D 1238 condition L in the range from 0.4 to 3 g/10 minutes.

14. The multilayer film according to claim 1 wherein the heterophasic composition forming layer B has a melt flow rate according to ASTM D 1238 condition L in the range from 0.5 to 1.5 g/10 minutes.

15. The multilayer film according to claim 1 wherein the polymer composition of layer B further comprises up to 75% by weight, referred to the total weight of layer B, of a component essentially the same as the polymer forming layer A but with a melt flow rate, according to ASTM D 1238 condition L, in the range 0.5–1 g/10 minutes.

16. A three-layer film ABA according to claim 1 wherein each of the skin layers A is present in amounts from 5 to 45% of the total weight of the film.

17. A three-layer film ABA according to claim 1 wherein the skin layers A are present in equal amounts, each in the range from 10 to 30% of the total weight of the film.

18. A multilayer packaging film according to claim 1.

* * * * *